United States Patent [19]

Edmondson

[11] 4,240,906
[45] Dec. 23, 1980

[54] LIQUID MEDIA CLARIFIER

[76] Inventor: Ellena L. Edmondson, 2034 Vallette Dr., Apt. 9, St. Louis, Mo. 63136

[21] Appl. No.: 79,587

[22] Filed: Sep. 28, 1979

[51] Int. Cl.$^3$ .............................................. C02F 3/06
[52] U.S. Cl. .................................... 210/617; 210/150; 210/169; 210/502; 119/5; 424/153
[58] Field of Search ................ 210/502, 503, 510, 75, 210/38 B, 39, 40, 36, 17, 150, 151, 169, 500 R; 252/378 R; 106/DIG. 3; 119/3, 5

[56] References Cited

U.S. PATENT DOCUMENTS

| | | | |
|---|---|---|---|
| 1,922,448 | 8/1933 | Miner | 210/500 R |
| 3,113,924 | 12/1963 | Mendius, Jr. | 252/378 R |
| 3,824,191 | 7/1974 | Wey et al. | 252/378 R |
| 3,953,357 | 4/1976 | Preston et al. | 210/500 R |
| 4,002,566 | 1/1977 | Smith | 210/169 |
| 4,035,298 | 7/1977 | Cloke et al. | 210/169 |
| 4,100,065 | 7/1978 | Etzel | 210/38 B |

FOREIGN PATENT DOCUMENTS

2009804 11/1970 Fed. Rep. of Germany ............. 210/75

*Primary Examiner*—Benoît Castel
*Attorney, Agent, or Firm*—Sabin C. Bronson

[57] ABSTRACT

A composition for enhancing the clarity of liquid media, for example, in aquariums comprises a major amount by volume of vermiculite particles and a minor amount of filter medium particles. The vermiculite acts to improve the propagation of aerobic bacteria which, in turn, help to remove toxic waste products from the tank. A particularly preferred filter medium involves particles of molecular sieves. In addition, the composition preferably includes a minor amount of sodium chloride. The composition is used by combining it with conventional aquarium gravel.

6 Claims, No Drawings

LIQUID MEDIA CLARIFIER

BACKGROUND AND SUMMARY OF THE INVENTION

This invention relates to improving the quality of liquid media used in aquariums containing living aquatic specimens. More particularly, this invention relates to a composition useful in such aquariums to enhance the clarity of such liquid media after prolonged use.

Raising tropical fish and other aquatic specimens is a hobby of substantial popularity. One of the more unpleasant aspects of this hobby is cleaning the aquarium in which the specimens are housed. The quality of the liquid media, e. g., water, in the aquarium is one important factor in determining when the aquarium needs cleaning. After prolonged use, the liquid media may become discolored, may give off an undesirable odor, and/or may become unhealthy for the specimens contained therein. Various approaches have been suggested to prolong the useful life of the liquid media. See, for example, U.S. Pat. No. 3,557,753. However, until now, no means has been provided for simply and effectively enhancing the clarity of aquarium liquid media after prolonged use.

Therefore, one object of the present invention is to provide an improved composition of matter useful to enhance the clarity of liquid media in an aquarium containing live aquatic specimens.

Another object of the present invention is to provide an improved composition of matter useful to remove undesirable coloring agents and odors from aquariums containing live aquatic specimens.

A still further object of the present invention is to provide an improved composition of matter useful as an aid in maintaining the health of living aquatic specimens.

An additional object of the present invention is to provide an improved method for enhancing the clarity of liquid media in an aquarium containing the living aquatic specimens.

Other objects and advantages of the present invention will become apparent hereinafter.

An improved composition of matter useful to enhance the clarity of liquid media, e.g., water, in an aquarium for containing living aquatic specimens, e.g., fresh and salt water tropical fish, has now been discovered. The composition comprises a major amount of vermiculite particles capable of providing improved propagation of useful bacteria, e.g., aerobic bacteria, at the conditions present in the aquarium. Such bacteria act to convert waste products from the living aquatic specimens in the aquarium. Thus, such bacteria are an important and necessary part in converting such waste matter or other toxic pollutants through several chemical stages or reactions into relatively innocuous compounds, e.g., nitrogenous compounds that can be utilized by plants and/or harmlessly dissipated into the atmosphere.

Another constituent of the present composition is a minor amount by volume of particles of at least one filter medium capable of removing, e.g., by absorption, adsorption or both, components from the aquarium's liquid medium which can impart an undesirable color and/or odor to the liquid media. Any suitable solid filter medium will suffice. However, the preferred filter medium is particles of a material selected from the group consisting of activated charcoal, molecular sieves and mixtures thereof. Molecular sieves are particularly preferred for use in the present invention since such materials have been found not only to remove color and/or odor causing bodies from the liquid media, but also, such molecular sieves further act to improve the establishment, propagation and growth of the useful bacteria noted above.

In one preferred embodiment, the present compositions include a minor amount, e.g., about 0.1% to about 10%, by volume of sodium chloride particles. The sodium chloride has been found to be of general therapeutic value to the living aquatic specimens in the aquarium. For example, this sodium chloride serves to bathe the delicate skin of fresh water tropical fish to help such fish ward off infectious diseases.

The present compositions may be used as follows. These vermiculite-based mixtures can be combined or admixed with the gravel or other like decorative material at the bottom of the portion of the aquarium containing the aquatic specimens. The compositions are especially effective in an aquarium equipped with a pump, preferably an air lift pump, for recirculating the liquid medium from below the gravel or other like material to the aquarium portion which contains the living specimens.

The present compositions provide substantial benefits. For example, when these compositions are used as noted above, the useful life of the liquid medium in the aquarium is substantially prolonged. In addition, the constituents of this composition is relatively inexpensive, readily available and present little or no handling problems. In short, the present compositions provide a simple, inexpensive, yet effective, way to provide a healthful, long-lasting aquarium environment for living aquatic specimens.

The vermiculite particles useful in the compositions of the present invention are readily available from garden supply stores or the like. The vermiculite, useful in these compositions, is preferably sterilized to avoid introducing unwanted micro-organisms into the aquarium. The vermiculite particles preferably are of approximately the same size as the gravel or other like material with which it is to be combined. However, particles of vermiculite which are larger or smaller than the gravel may be used. The vermiculite provides for growth and propagation of aerobic bacteria use in converting waste products from living aquatic specimens. In addition, the vermiculite serves to aerate the portion of the aquarium holding the aquatic specimens. Such aeration is beneficial as the aquatic specimens and aerobic bacteria need abundant oxygen for life. Preferably, the vermiculite particles comprise at least about 70%, preferably about 75%, by volume of the present compositions.

The molecular sieves useful in the present compositions include those which are capable of removing components from the liquid media in the aquarium which can impart an undesirable color and/or odor to the liquid media. Of course, the molecular sieves, as well as any other filter medium used in the present compositions, must have substantially no deleterious effect on the living aquatic specimens in the aquarium where the composition is to be used. Molecular sieves include one of the earth's most abundant substances and act to remove impurities from the liquid medium, e.g., water, present in the aquarium. In addition, such molecular sieves further act to provide an effective environment for the prolific establishment of aerobic bacteria useful in converting waste products as noted above.

In general, molecular sieves may be characterized as either natural or synthetic crystalline aluminosilicates, e.g., having pores with diameters in the range of about 6 Å or less to about 15 Å or more and a silica to alumina mole ratio of about 2 or less to about 20 or more. Among the naturally occuring molecular sieves are the faujasites, mordenites and many other forms. The synthetic molecular sieves are generally prepared by precipitation from aqueous solutions of aluminum, silicon and alkali metal compounds, particularly salts and oxides. The precipitate is generally aged for one or more days to allow crystallization to occur. Many molecular sieves include combined water as part of the crystal structure. In any event, the detailed structure and methods of manufacture of many molecular sieves is conventional and well known in the art. Therefore, such details need not be presented here in order to enable one skilled in the art to practice the invention.

Both natural and synthetic molecular sieves meeting the criteria set forth herein may be used in the present composition. Such molecular sieves are conventional and are commercially readily available. The size of the molecular sieve particles may vary. However, like the vermiculite particles, it is preferred that the molecular sieve particles have approximately the same size as the decorative gravel or other like material with which it is to be mixed or combined. Preferably, the particles of filter medium, such as molecular sieves, comprise at least about 5%, more preferably about 25%, by volume of the present compositions. All volume concentrations set forth herein are on a dry or apparently water-free basis. Combined water, in the crystal structure of the molecular sieves, is included in the calculations of the concentrations since such combined water is not apparent.

Sodium chloride is, of course, abundant, readily available and relatively inexpensive. The size of the sodium chloride particles may vary and may be, for example, the size of particles of table salt. The present compositions preferably comprise about 0.1% to about 10%, more preferably about 0.5% to about 8%, by volume of sodium chloride.

One particularly preferred method for preparing the present compositions for use in aquariums is as follows. The desired amount of dry composition is combined with a small amount of water, e.g., sufficient to fill the void space for the dry composition. This water-composition mixture, is heated at about 50° C. to about 100° C., for a period of time, preferably about 15 minutes to possibly an hour sufficient to allow the vermiculite to absorb sufficient water. It is then allowed to cool and placed in a plastic bag so that when the contents are introduced into the aquarium the vermiculite particles will settle to the bottom, gravel level, of the aquarium.

The present compositions are useful in both fresh or salt water aquariums. Thus, the liquid media may be fresh water, salt water or a synthetic mixture, e.g., simulating salt water. Also, these compositions are substantially harmless to plants and any form of aquarium life. Further, the compositions do not detract from the appearance of the aquarium. Once an abundance of aerobic bacteria is established, the chemical conversion cycle for the waste products keeps the liquid media clear, clean and free of toxic pollutants.

DESCRIPTION OF THE PREFERRED EMBODIMENT

In one particularly preferred embodiment the majority, by volume, of all particles in the present compositions have diameters in the range of about 0.005 inch to about 0.35 inch. Particularly excellent results are obtained with a composition comprising about 83% by volume vermiculite particles; about 13% by volume molecular sieve particles; and about 4% by volume sodium chloride particles.

The following examples of a non-limiting nature are included to illustrate the present invention.

EXAMPLE I

A fresh water aquarium has a capacity of 20 gallons of fresh water. This conventional aquarium is equipped with an air lift pump which circulates water from below the decorative gravel level of the aquarium to that portion of the aquarium above the gravel level which contains a suitable assortment of fresh water tropical fish. This air lift pump also helps to aerate the water prior to the water being reintroduced into the aquarium.

After the aquarium is cleaned, a clean supply of water is added and the aquarium is placed into operation. Clean water is added periodically to make up for evaporation losses. After a period of time, the water in the aquarium is found to have an unacceptably high concentration of toxic pollutants, from waste products. The water must be completely changed and the aquarium cleaned in order to protect the lives of the tropical fish.

EXAMPLE II

Example I is repeated except that prior to commencing operation of the aquarium, the following mixture is added to the decorative gravel in the aquarium.

Vermiculite particles commercially available—One quart
Molecular sieve particles—⅓ cup
Sodium chloride particles—10 teaspoons This mixture is placed in a plastic bag along with sufficient water to fill the void space left by the mixture of particles. The average size of the particles by volume in this mixture is approximately equal to the average size of the decorative gravel in the aquarium. The plastic bag is immersed in a bath of boiling water, e.g., at about 95°–100° C., for one hour. The mixture, after cooling, is introduced into the aquarium and blends in with the decorative gravel.

The aquarium is placed into operation as before. Clean water is added periodically to make up for evaporation losses. The aquarium continues to have an acceptably low concentration of toxic pollutants even after the period of operation in which the aquarium in Example I required cleaning.

Example II clearly shows that the presence of the present compositions provides improved (relative to Example I) enhancement in the clarity of liquid media in aquariums containing living aquatic specimens.

Having thus described my invention what I claim and desire to secure by Letters Patent is:

1. A composition of matter useful to enhance the clarity of liquid media, for example, in an aquarium for containing living aquatic specimens consisting essentially of at least about 50% by volume of vermiculite particles capable of providing improved propagation of aerobic bacteria at the conditions present in said aquarium, said bacteria acting to convert waste products from said aquatic specimens, and at least about 5% by volume of particles of molecular sieves capable of removing components from said liquid media which can impart an undesirable color and/or odor to said liquid media and from about 0.1 to about 10% by volume of sodium chloride particles.

2. The composition of claim 1 wherein said sodium chloride particles comprise about 0.5% to about 8% by volume of said composition, and wherein said vermiculite particles comprise at least about 75% by volume of said composition and said molecular sieve particles are present in an amount in the range of about 5% to about 25% by volume of said composition.

3. The composition of claim 2 wherein the majority, by volume, of all particles in said composition have diameters in the range of about 0.005 inch to about 0.35 inch.

4. A method of enhancing the clarity of liquid media, in an aquarium for containing living aquatic specimens, said aquarium containing gravel at the bottom of the portion of said aquarium containing said specimens and said aquarium being equipped with an air lift pump for recirculating liquid media from below said gravel to said portion of said aquarium containing said specimens, said method comprising combining an effective amount of the composition of claim 2 with said gravel.

5. The composition of claim 2 wherein said vermiculite particles comprise about 83% by volume of said composition, said molecular sieve particles comprise about 13% by volume of said composition and said sodium chloride particles comprise about 4% by volume of said composition.

6. A method of enhancing the clarity of liquid media, in an aquarium for containing living aquatic specimens, said aquarium containing gravel at the bottom of the portion of said aquarium containing said specimens and said aquarium being equipped with a pump for recirculating liquid medium from below said gravel to said portion of said aquarium containing said specimens, said method comprising combining an effective amount of the composition of claim 1 with said gravel.

* * * * *